Patented Sept. 1, 1942

2,294,592

UNITED STATES PATENT OFFICE 2,294,592

PREPARATION AND PURIFICATION OF NITRATED PENTAERYTHRITOLS

Joseph A. Wyler, Allentown, Pa., assignor to Trojan Powder Company, Allentown, Pa.

No Drawing. Application April 29, 1940,
Serial No. 332,266

4 Claims. (Cl. 260—467)

This invention relates to the nitration of pentaerythritol to pentaerythritol tetranitrate and of dipentaerythritol to dipentaerythritol hexanitrate.

It is well known that pentaerythritol can be nitrated to pentaerythritol tetranitrate and dipentaerythritol to dipentaerythritol hexanitrate by means of concentrated nitric acid alone or by means of concentrated nitric acid combined with a dehydrating agent as concentrated sulphuric acid. In all these processes the nitrated charge, after completion of the nitration, is allowed to flow into water in order to recover the pentaerythritol tetranitrate or dipentaerythritol hexanitrate.

I have discovered that, if instead of running the nitrated charge into water, the water is run into the nitration mixture, an unexpected and useful result is obtained; also, that if the nitration is carried out in a certain manner no dilution with water is necessary and the pentaerythritol tetranitrate may be separated by direct filtration of the nitrated charge.

An object of my invention is to prepare a pentaerythritol tetranitrate of a high degree of purity, directly in the nitration. Another object is to obtain a relatively pure dipentaerythritol hexanitrate as a by-product. Other and further objects will become apparent upon a perusal of this specification.

In order more clearly to point out my invention the following examples (in which all parts are by weight) are given by way of illustration.

Example #1

100 parts of a high grade, commercial pentaerythritol of melting point 250°–254° C. were added to 630 parts of 95.5% $HNO_3$ at a temperature below 30° C., over a period of about 30 minutes. The mixture was efficiently stirred during the addition and for 30 minutes thereafter. It was then filtered upon an asbestos mat and the filtrate collected. The filter cake was washed with cold water until substantially free from acid, then with hot water, then treated with an excess of 2% $Na_2CO_3$ solution, washed with water and dried. It now weighed about 220 parts and contained 17.64% nitrogen as against 17.73% nitrogen for pure pentaerythritol tetranitrate.

To the spent acid obtained in the filtration of the nitration mixture, cold water was added in a fine stream. This caused the precipitation of a few parts of a viscous material which proved to be substantially dipentaerythritol hexanitrate. By settling, washing, and standing, this material soon solidified.

As is well known, a pentaerythritol of melting point 250°–254° C. contains about 4–3% of dipentaerythritol. Consequently, the nitration produces a mixture of pentaerythritol tetranitrate and some dipentaerythritol hexanitrate. My work shows that if the nitration is carried out by filtering the completed nitration mixture obtained as described above, before adding any substantial amount of water, a pentaerythritol tetranitrate of relatively greater purity is obtained than when the nitration mixture is either drowned in water or treated with water, added a little at a time. The reason for this greater purity is that the spent acid remaining after the nitration has a greater solvent effect for dipentaerythritol hexanitrate than it does for the pentaerythritol tetranitrate and therefore when this clear spent acid is separated from the pentaerythritol tetranitrate precipitate, the dipentaerythritol hexanitrate goes with the spent acid, thus purifying the pentaerythritol tetranitrate. Also, the addition of a large proportion of water to this clear spent acid precipitates the dipentaerythritol hexanitrate almost quantitatively and therefore serves to recover the dipentaerythritol hexanitrate in comparatively pure condition. This process of nitration serves for the preparation of pentaerythritol tetranitrate and of dipentaerythritol hexanitrate, each in relatively pure condition, and is particularly adapted to the nitration of commercial pentaerythritol of high dipentaerythritol content, as for example the product melting at 185°–190° C. which contains 70% pentaerythritol and 30% dipentaerythritol. The two following examples, using this type of pentaerythritol are further illustrative of the advantages of my process.

Example #2

100 parts of low melting point (185°–190° C.) pentaerythritol were added to 630 parts of 95% $HNO_3$ and the nitration carried out as under Example #1.

In this case about 28 parts of dipentaerythritol hexanitrate were obtained from the spent acid, indicating that about half of all the dipentaerythritol hexanitrate which formed was recovered. The pentaerythritol tetranitrate contained 17.44% nitrogen as compared to 17.14% nitrogen which is usually obtained by the commercial and generally known processes when using this low grade pentaerythritol. This improvement of .3% nitrogen constitutes a distinct advance in the art.

Example #3

100 parts of low melting point (185°-190° C.) pentaerythritol were added to 800 parts of 95% HNO3 and the nitration carried out as under Example #1.

In this case about 39 parts of dipentaerythritol hexanitrate were obtained, indicating a yield of about 65% of all the dipentaerythritol hexanitrate formed. The pentaerythritol tetranitrate contained 17.44% nitrogen. The spent acid obtained after the filtration but before the addition of water analyzed 81.07% HNO3 and 0.24% N2O3.

Example #4

100 parts of a high grade pentaerythritol (melting point 250°-254° C.) were added to 630 parts of 96% HNO3 at a temperature below 30° C., over a period of about 30 minutes. The mixture was efficiently stirred during the addition and for 30 minutes thereafter. Into this nitration mixture, a small stream of cold water was added, keeping the temperature of the mixture below 50°-60° C., until the acidity of the solution was about 40% HNO3 or less. About 5-10 minutes were required for this addition. The mixture was then filtered, the precipitate washed, neutralized, etc. in the same manner as under Example #1.

The yield of pentaerythritol tetranitrate+dipentaerythritol hexanitrate obtained in the present example was 210-230 parts and the nitrogen content of the product was 17.46-17.50% nitrogen, which is an unexpected result. The result to be expected was a product of much lower nitrogen content and the fact that the nitrogen content of the product is about 17.50% shows that the nitration process, as carried out, is not a reversible reaction as is the case with other carbohydrates as starch, cellulose, etc. Thus, with starch the nitrogen content would have been reduced from about 12.0% to 6.25% through the addition of the water to the nitrating bath.

This method of nitration (addition of the water to the nitrating bath instead of the usual commercial method of adding the nitration mixture to a large excess of water) has several advantages.

One advantage of this process is that it is particularly adapted to low grade pentaerythritol in that the amount of water added after the nitration may be varied by the operator to obtain a particular degree of precipitation of the dipentaerythritol hexanitrate and other impurities along with the pentaerythritol tetranitrate which is practically insoluble in the spent acids. Thus, if a high grade pentaerythritol is started with, a larger amount of water may be added than when a lower grade is used. In general, a spent acid containing about 80% HNO3, is preferred because it has only a slight solvent effect upon the pentaerythritol tetranitrate and a much greater solvent effect upon the dipentaerythritol hexanitrate and other impurities. Another advantage is, of course, that it serves to prepare dipentaerythritol hexanitrate at the same time that it purifies the pentaerythritol tetranitrate.

In those cases in which a high melting point pentaerythritol is used I often prefer to modify my procedure somewhat. Thus I may use, say a 98% HNO3 and a ratio of HNO3 to pentaerythritol of more than 6 to 1 in order to obtain a slightly higher degree of nitration. Also, in order to reduce the acidity of the spent acid to, say, 80% HNO3, I add water directly to the nitration mixture with stirring and cooling. Also, I may add enough water to lower the acidity of the spent acid to 75% HNO3 or less before filtering, depending upon what use is to be made of the pentaerythritol tetranitrate or of the spent acid. It should be noted in this connection that the nitrogen content of the precipitated pentaerythritol tetranitrate is reduced through the addition of water, only if sufficient water is added to reduce the acidity below about 75% HNO3 and only in those cases where the pentaerythritol tetranitrate contains appreciable amounts of dipentaerythritol hexanitrate, but this lowering of nitrogen content is not due to hydrolysis, but due to the coprecipitation of dipentaerythritol hexanitrate.

In actual plant operations there will be times when the pentaerythritol tetranitrate produced is not of sufficient purity for certain uses, due to the precipitation of dipentaerythritol hexanitrate upon the pentaerythritol tetranitrate. In such cases I often prefer to stir this inferior product in contact with a nitric acid of 75-80%, or higher, strength in order to extract dipentaerythritol hexanitrate from the product without dissolving much pentaerythritol tetranitrate. The mixture is then filtered without dilution and the pentaerythritol tetranitrate washed on the filter, stabilized and dried.

It will be clear from the disclosure given above that although the main object of this invention is to prepare pentaerythritol tetranitrate, a secondary and closely related object is to prepare dipentaerythritol hexanitrate.

I wish to emphasize that the examples given are for purposes of illustration and clarity and are not intended to serve as limiting my invention to the specific conditions mentioned. I may vary the strength and proportions of the HNO3 to the pentaerythritol over a wide range, provided that the acid is strong enough to effect the nitration and to selectively dissolve the impurities in the nitrated product; I may vary the time and temperature of the nitration considerably or utilize such other alterations in the process as would occur to a workman skilled in this art and I do not limit myself in any way except as indicated in the following claims.

I claim:

1. The process for the preparation of pentaerythritol nitrates comprising nitrating a mixture of pentaerythritol and dipentaerythritol in concentrated nitric acid, the ratio of pentaerythritols to nitric acid and the strength of the nitric acid being such that the spent acid produced by the nitration is greater than 75% HNO3; adding water to this nitration mixture, stirring, then filtering off the pentaerythritol nitrates formed, washing with water and stabilizing.

2. The process for the preparation of pentaerythritol tetranitrate comprising nitrating a mixture of pentaerythritol and dipentaerythritol, in which the pentaerythritol is the major constituent and the dipentaerythritol the minor constituent, in concentrated nitric acid; the ratio of the total amount of pentaerythritol and dipentaerythritol to nitric acid being about 1 part to at least 8 parts, by weight, the strength of the nitric acid being about 96% HNO3 and the temperature of nitration being less than 30° C.; adding water to the nitrating bath until the spent acid reaches an acidity of about 75% to about 80% HNO3, stirring, then filtering, washing the pentaerythritol tetranitrate with water and stabilizing.

3. The process for purifying a pentaerythritol tetranitrate containing some dipentaerythritol hexanitrate which comprises extracting this impure pentaerythritol tetranitrate with a nitric acid of about 75% to about 80% strength, said extraction step effecting the removal, by solution, of the dipentaerythritol hexanitrate from the pentaerythritol tetranitrate, which is practically insoluble in the nitric acid used; filtering off the insoluble pentaerythritol tetranitrate, and washing with water.

4. The process for the preparation of dipentaerythritol hexanitrate which comprises nitrating a mixture of pentaerythritol and dipentaerythritol in concentrated nitric acid, the ratio of the total amount of pentaerythritol and dipentaerythritol to nitric acid and the strength of the nitric acid being such that the spent acid produced by the nitration contains more than 75% nitric acid; then filtering off the pentaerythritol tetranitrate formed, adding water to the filtrate to effect the precipitation of the dipentaerythritol hexanitrate and separating the latter.

JOSEPH A. WYLER.